United States Patent
Hood

(10) Patent No.: US 9,603,447 B2
(45) Date of Patent: Mar. 28, 2017

(54) READING MATERIAL CARRIER AND STAND

(71) Applicant: Sandra D. Hood, Morrow, GA (US)

(72) Inventor: Sandra D. Hood, Morrow, GA (US)

(*) Notice: Subject to any disclaimer, the term of this patent is extended or adjusted under 35 U.S.C. 154(b) by 317 days.

(21) Appl. No.: 14/591,085

(22) Filed: Jan. 7, 2015

(65) Prior Publication Data
US 2015/0192245 A1    Jul. 9, 2015

Related U.S. Application Data

(60) Provisional application No. 61/924,289, filed on Jan. 7, 2014.

(51) Int. Cl.
| | |
|---|---|
| *A45F 4/00* | (2006.01) |
| *A45F 3/02* | (2006.01) |
| *A47B 23/06* | (2006.01) |
| *F16M 13/06* | (2006.01) |
| *A47B 23/02* | (2006.01) |
| *A47B 23/00* | (2006.01) |

(52) U.S. Cl.
CPC ............. *A47B 23/06* (2013.01); *A47B 23/02* (2013.01); *F16M 13/06* (2013.01); *A47B 23/004* (2013.01)

(58) Field of Classification Search
CPC ....... A47B 23/06; A47B 23/02; A47B 23/004; F16M 13/06
USPC .................................. 224/584, 575, 607, 634
See application file for complete search history.

(56) References Cited

U.S. PATENT DOCUMENTS

| | | | | |
|---|---|---|---|---|
| 2,597,473 A | * | 5/1952 | Green | A45C 5/005 |
| | | | | 132/315 |
| 2,609,072 A | * | 9/1952 | Levinson | A47B 3/10 |
| | | | | 108/33 |
| 3,090,330 A | * | 5/1963 | Best | A45F 5/00 |
| | | | | 108/135 |
| 3,541,976 A | * | 11/1970 | Rozas | A47B 23/002 |
| | | | | 108/43 |
| 5,016,852 A | * | 5/1991 | Herendeen | A47B 23/02 |
| | | | | 248/447.2 |
| 6,234,085 B1 | * | 5/2001 | Ramundo | A47B 23/002 |
| | | | | 108/143 |
| 7,731,147 B2 | * | 6/2010 | Rha | A47B 23/002 |
| | | | | 248/447 |
| D630,452 S | * | 1/2011 | Robbins | D14/457 |

(Continued)

FOREIGN PATENT DOCUMENTS

WO    WO2009046552 A1 *  4/2009 ............. A47B 23/04

*Primary Examiner* — Justin Larson
*Assistant Examiner* — Lester L Vanterpool

(57) ABSTRACT

A reading material carrier and stand is a device that is utilized to store and transport books and other reading materials as well as serve as a stand for convenient reading and writing. The device features a hollow spine and a foldable housing shell with a slide-out accessory panel and a slide-out writing panel. The accessory panel is capable of storing accessories while the writing panel provides a rigid and flat surface on which to write. The device additionally features a snake lamp for illumination during reading and writing that is flexible and may be adjusted to an orientation that is convenient for the user. The device is able to serve as a stand and may be mounted to a desk or similar object via a securing clamp. When folded for convenient transportation, the device may be easily transported through a carrying strap.

20 Claims, 9 Drawing Sheets

(56) References Cited

U.S. PATENT DOCUMENTS

| | | | | |
|---|---|---|---|---|
| D647,302 S | * | 10/2011 | Hoang | D3/288 |
| 8,104,655 B2 | * | 1/2012 | Zhang | A45F 5/00 |
| | | | | 224/257 |
| 8,807,406 B1 | * | 8/2014 | Thach | A45F 5/00 |
| | | | | 224/153 |
| 2002/0104769 A1 | * | 8/2002 | Kim | G06F 1/1601 |
| | | | | 206/320 |
| 2011/0168035 A1 | * | 7/2011 | Saunders | A47J 39/02 |
| | | | | 99/537 |

* cited by examiner

DETAIL A

DETAIL B

READING MATERIAL CARRIER AND STAND

The current application claims a priority to the U.S. Provisional Patent application Ser. No. 61/924,289 filed on Jan. 7, 2014.

FIELD OF THE INVENTION

The present invention relates generally to a carrier for reading materials. More specifically, the present invention is a reading material carrier that additionally serves as a stand for comfortable reading and writing. The present invention is additionally capable of providing the user with illumination and holding various accessories.

BACKGROUND OF THE INVENTION

When reading books, magazines, and other reading materials, it is often desirable to place the reading materials in a position and orientation that is comfortable for the reader. Over time, improper reading posture can lead to a host of issues such as pain in the neck, shoulders, and back. Additionally, proper posture is essential to reducing strain on the reader's eyes. Reading is often accompanied by other activities such as note-taking, a common activity amongst students. Reading and writing simultaneously generally requires the reader/writer to place both the reading material and the writing material on a flat surface such as a desk. This setup may result in a very uncomfortable reading and writing experience, particularly if one remains stationary in the same position for an extended period of time. Desk height is often not optimized for individual users and as such, it can be difficult to maintain proper posture when reading and writing at a desk. Most often, this results in the reader/writer being forced to hunch downward in order to properly read and write on a desk. In addition to proper posture, sufficient lighting is required for reducing eye strain and is a significant factor in providing a quality reading and writing experience. Ambient room lighting is often used when reading and writing although ambient room lighting is generally designed for lighting a large space and is not optimized for reading and writing.

The present invention is a reading material carrier and stand that is utilized to transport books and to serve as a stand for reading and writing materials when reading and writing. When in use as a stand, the present invention is able to securely hold reading materials in place. The present invention serves as a carrier, stand, and is additionally capable of providing illumination to the reading and writing surface when the present invention is in use. The present invention additionally features a light source for providing the user with illumination when reading and writing. The present invention is additionally capable of holding various accessories and may be secured to an object such as a desk or chair. In addition to reading materials such as books and magazines, the present invention may be further utilized in conjunction with various electronic devices such as, but not limited to, tablet computers.

DETAIL DESCRIPTIONS OF THE INVENTION

Figure 1:
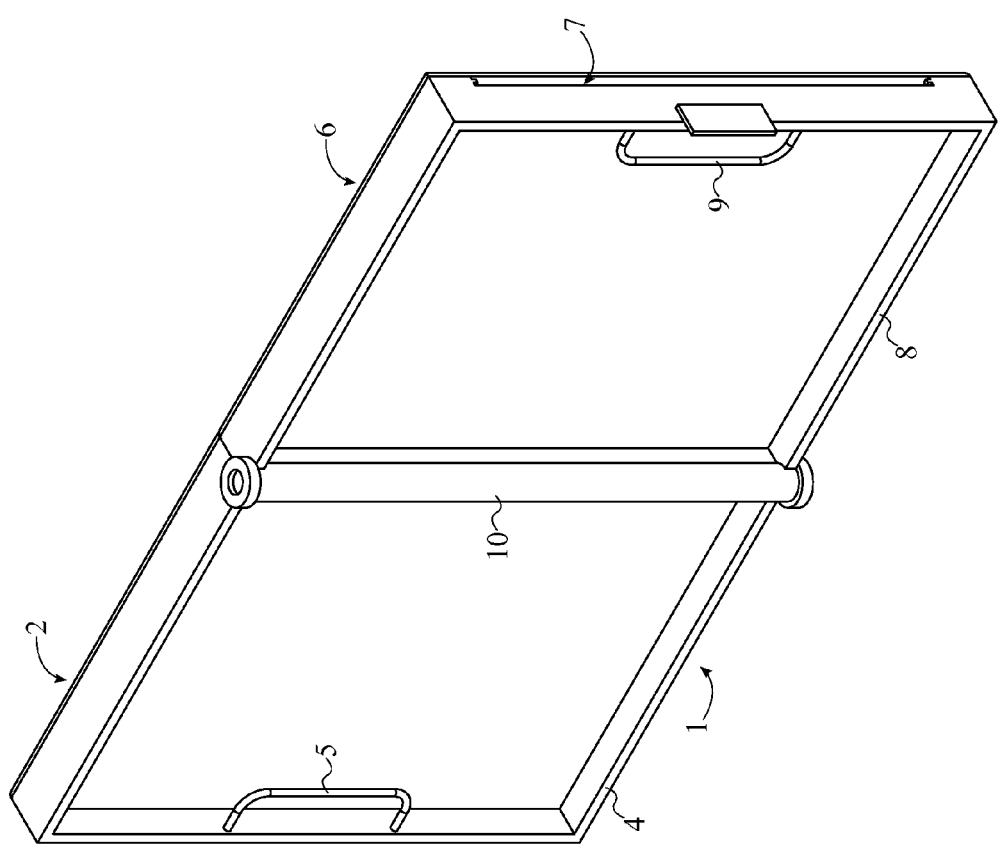
FIG. 1 is a top perspective view from the right side of the foldable housing shell.

All illustrations of the drawings are for the purpose of describing selected versions of the present invention and are not intended to limit the scope of the present invention.

The present invention is a reading material carrier and stand that is capable of transporting reading materials and serving as a stand for convenient reading and writing. With reference to FIGS. 1-7, the present invention comprises a foldable housing shell 1, an accessory panel 11, a writing panel 14, a snake lamp 18, a pivot rod 19, and a securing clamp 20.

Figure 2:
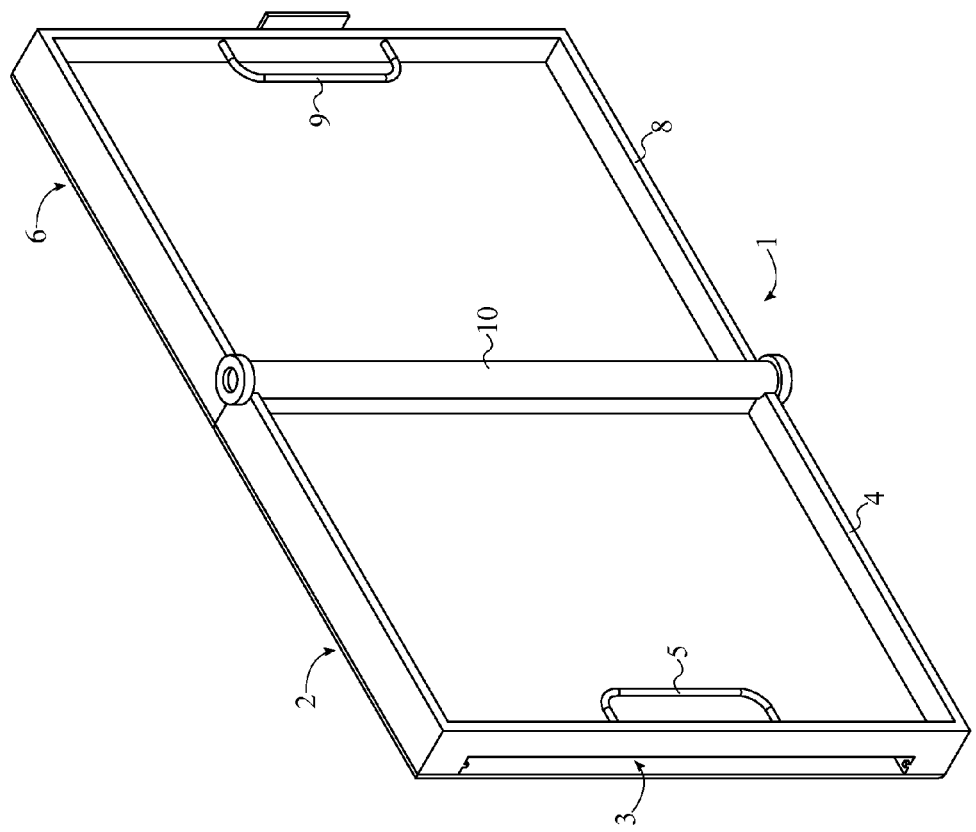
FIG. 2 is a top perspective view from the left side of the foldable housing shell.

The foldable housing shell 1 is shown in FIG. 1 and FIG. 2 and may be folded or unfolded. When folded, the foldable housing shell 1 is able to protect and transport reading materials within the foldable housing shell 1. However, the foldable housing shell 1 may be unfolded as well in order to serve as a stand for reading and writing. The foldable housing shell 1 comprises a first resting panel 2, a second resting panel 6, and a hollow spine 10. The first resting panel 2 and the second resting panel 6 are utilized to support the corresponding front cover and rear cover of a book or other reading materials with a central binding, such as magazines, and to support their reading material pages. The first resting panel 2 is hingedly connected to the second resting panel 6 by the hollow spine 10. This allows the foldable housing shell 1 to be folded and unfolded as needed to transport reading materials and serve as a stand, respectively.

With reference to FIGS. 3-6, the accessory panel 11 is utilized to hold various accessories such as, but not limited to, writing utensils. The accessory panel 11 is slidably mounted into the first resting panel 2, opposite to the hollow spine 10. As such, the accessory panel 11 may be slid into the first resting panel 2 in order to safely store any accessories within the first resting panel 2. The accessory panel 11 is positioned opposite to the hollow spine 10 in order to allow convenient access to the accessory panel 11 when the foldable housing shell 1 is folded or unfolded.

The writing panel 14 serves as a flat and rigid surface that supports paper or other stationery when no other suitable surface is available. Similar to the accessory panel 11 being slidably mounted into the first resting panel 2, the writing panel 14 is slidably mounted into the second resting panel 6, opposite to the hollow spine 10. The writing panel 14 is positioned opposite to the accessory panel 11 when the foldable housing shell 1 is unfolded and in use as a stand. Again similar to the accessory panel 11, the writing panel 14 may be slid into the second resting panel 6 to safely stow away the writing panel 14 within the second resting panel 6 when not in use.

Figure 3:
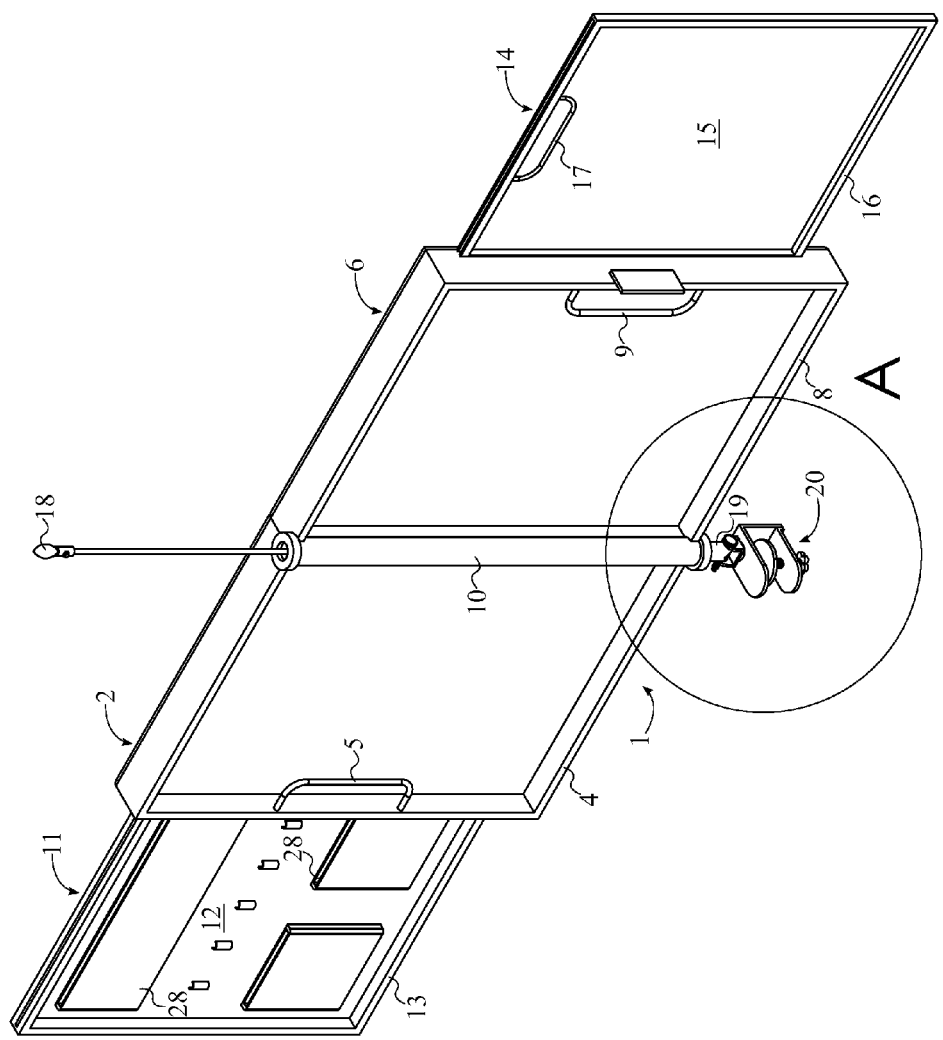
FIG. 3 is a top perspective view of the present invention in an open configuration, wherein the securing clamp of the present invention is engaged.
Figure 5:
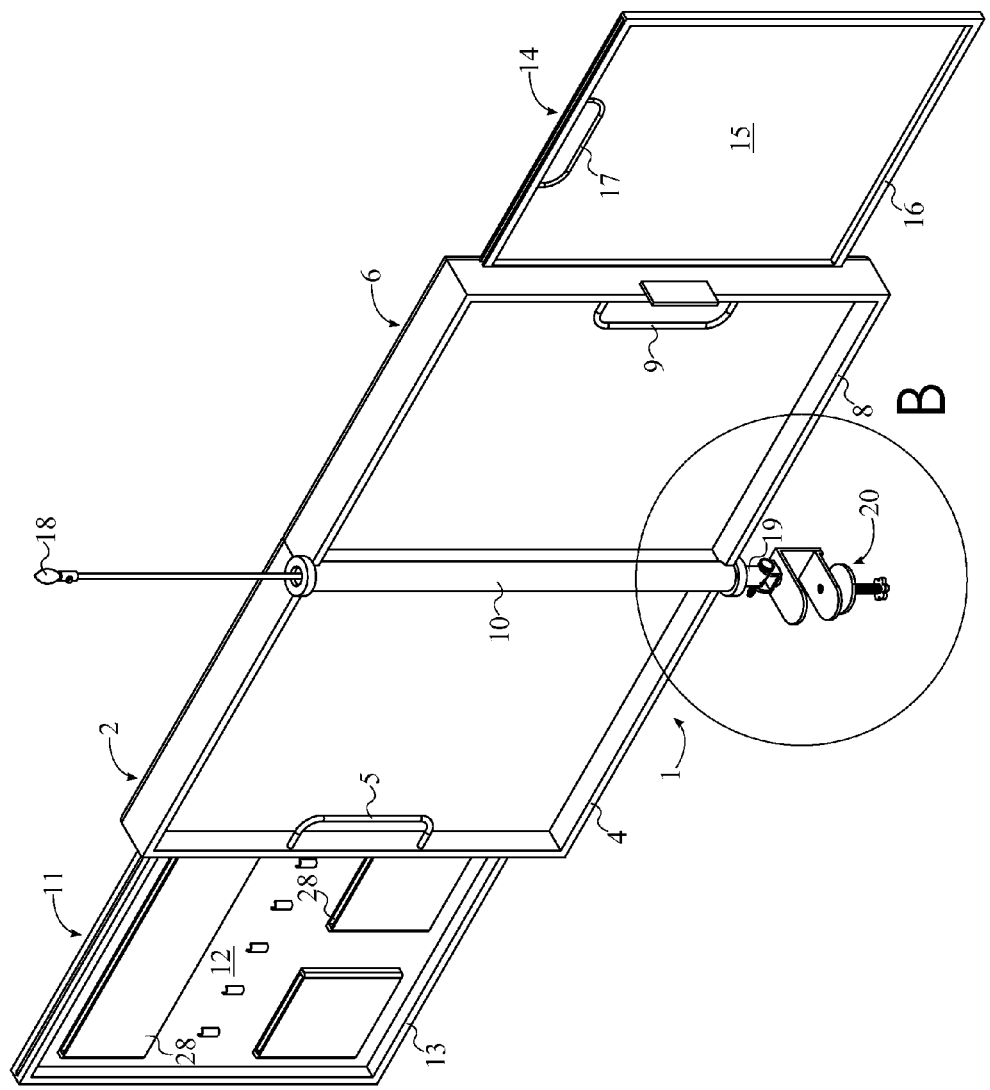
FIG. 5 is an additional top perspective view of the present invention in an open configuration, wherein the securing clamp of the present invention is disengaged.
Figure 7:
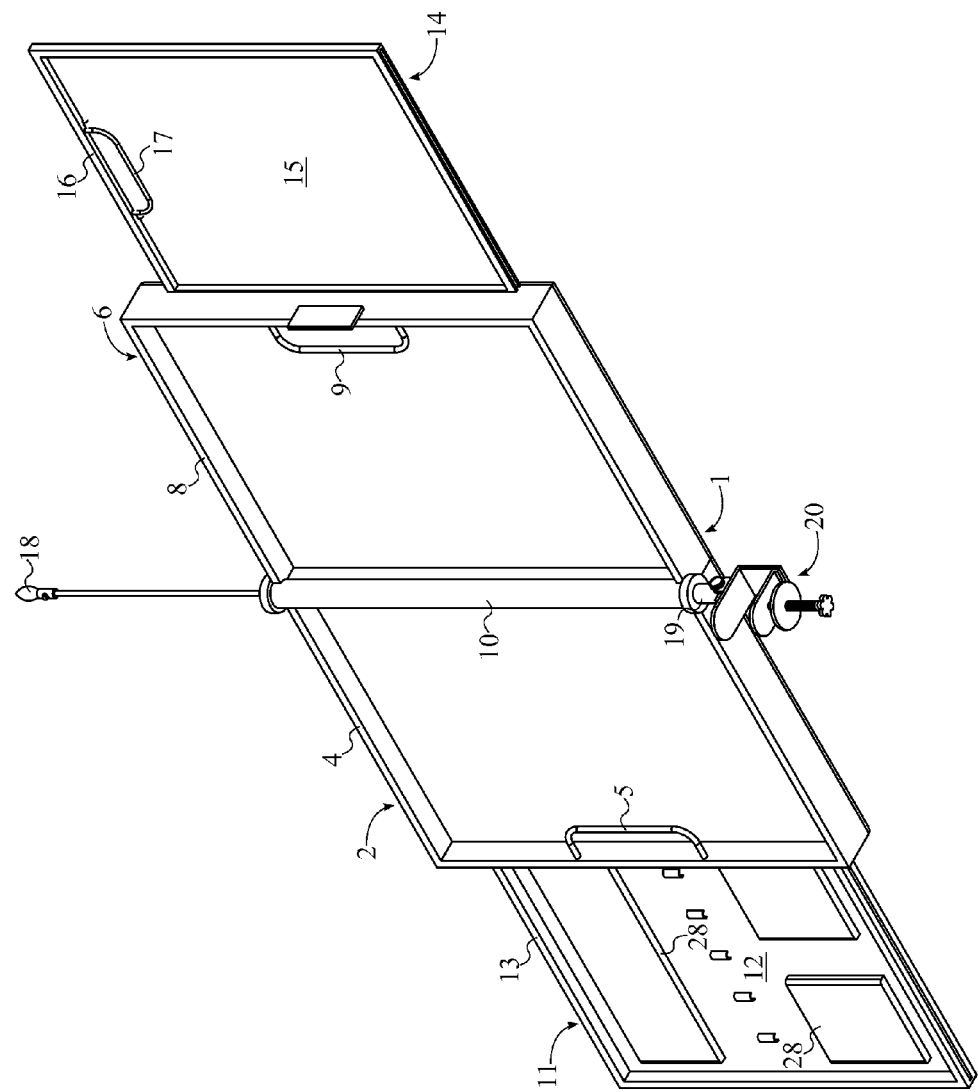
FIG. 7 is a bottom perspective view of the present invention in an open configuration.

The snake lamp 18 shown in FIG. 3, FIG. 5, and FIG. 7 serves as a light source for the user when reading and writing. The snake lamp 18 is flexible and may be adjusted to an orientation that is convenient for the user. The snake lamp 18 is telescopically mounted into the hollow spine 10, allowing the user to safely store the snake lamp 18 within the hollow spine 10 when the snake lamp 18 is not in use. Power to the snake lamp 18 may be provided by a disposable or rechargeable power source such as a lithium-ion battery.

Figure 4:
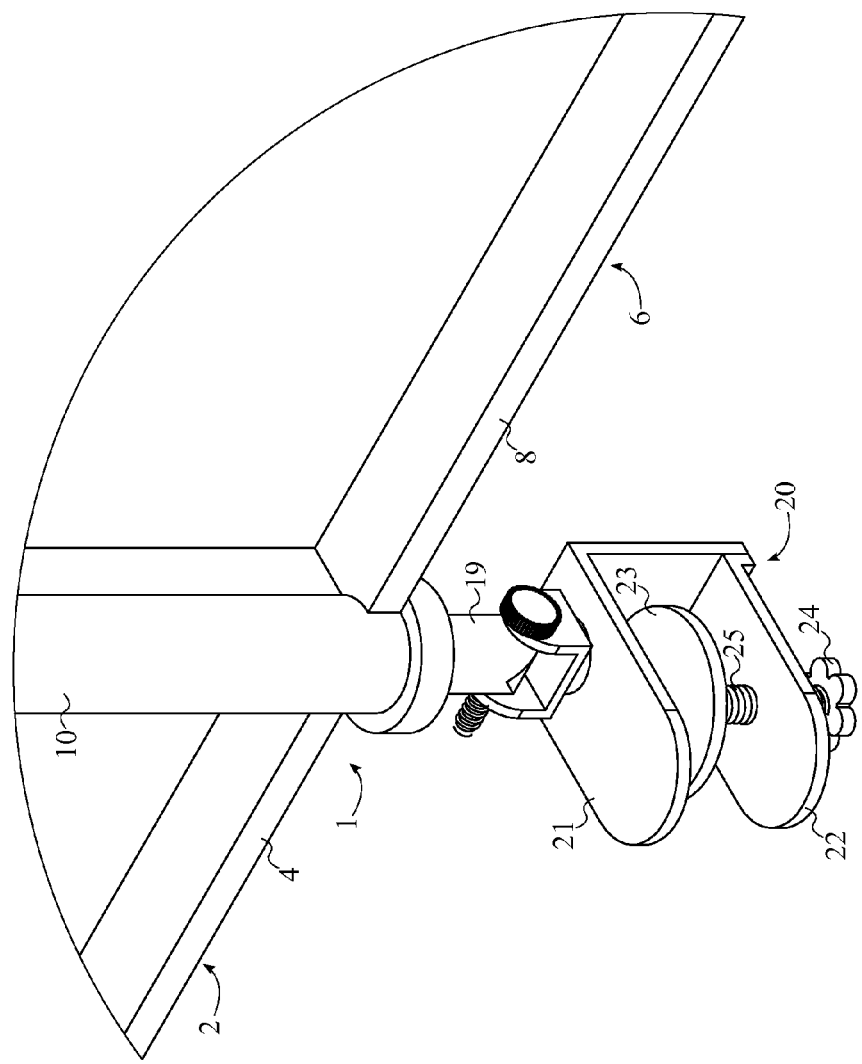
FIG. 4 is a detail view of the present invention taken from circle A of FIG. 3.
Figure 6:
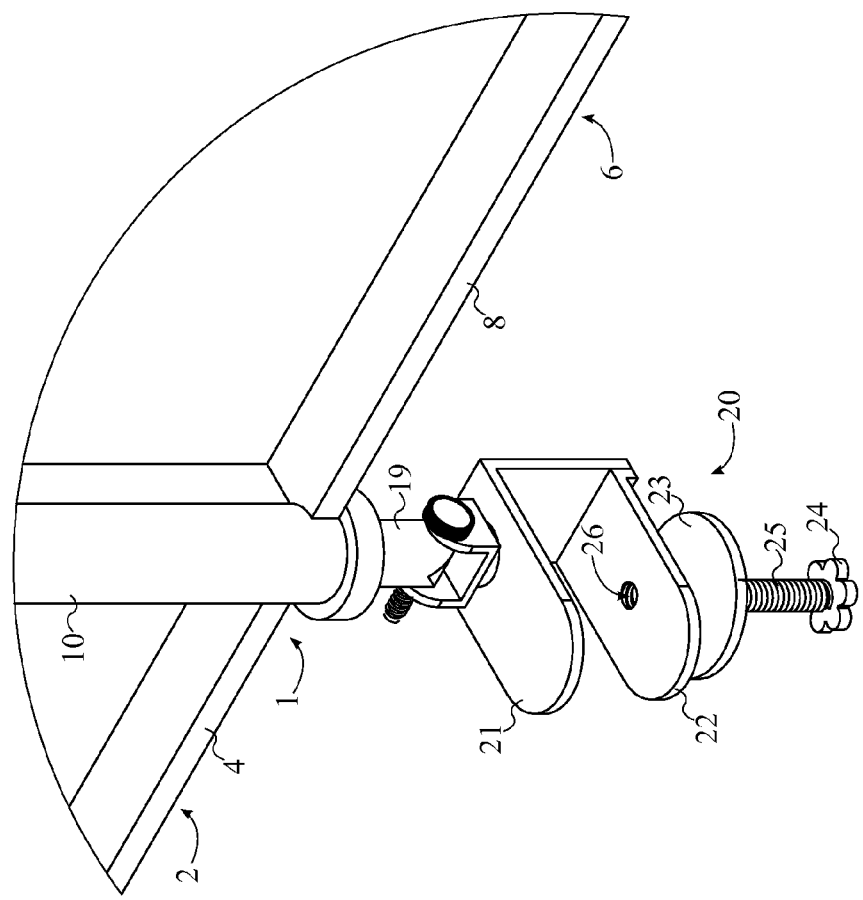
FIG. 6 is a detail view of the present invention taken from circle B of FIG. 5.

With reference to FIG. 4 and FIG. 6, the securing clamp 20 allows the user to mount the present invention to a desk, chair, or similar object in order to utilize the present invention as a stand. The pivot rod 19 is utilized to connect the foldable housing shell 1 to the securing clamp 20 and is adjustable as well to orient the foldable housing shell 1 into a convenient position when the present invention is used as a stand. The securing clamp 20 is hingedly connected to the pivot rod 19, opposite to the hollow spine 10. This places the securing clamp 20 into a position that is offset from the hollow spine 10 and additionally allows the securing clamp 20 to be adjusted into an orientation that is convenient for the user. As shown in FIG. 7, the pivot rod 19 is telescopically mounted into the hollow spine 10, opposite to the snake lamp 18, allowing the pivot rod 19 to be inserted into or drawn out of the hollow spine 10 as needed when adjusting the positioning of the securing clamp 20. In the preferred embodiment of the present invention, the pivot rod 19 is removable from the hollow spine 10. In alternative embodiments of the present invention, the hollow spine 10, the pivot rod 19, and the securing clamp 20 may be sized in a manner such that the pivot rod 19 and the securing clamp 20 may be fully inserted and contained within the hollow spine 10 when not in use.

Again with reference to FIGS. 1-6, the first resting panel 2 comprises a left storage compartment 3 while the second resting panel 6 comprises a right storage compartment 7. The left storage compartment 3 is utilized to contain the accessory panel 11 when the accessory panel 11 is not in use. As such, the left storage compartment 3 traverses into the first resting panel 2, opposite to the hollow spine 10. This allows the accessory panel 11 to be contained within the first resting panel 2. Similarly, the right storage compartment 7 is utilized to contain the writing panel 14 when the writing panel 14 is not in use. The right storage compartment 7 traverses into the second resting panel 6, opposite to the hollow spine 10, allowing the writing panel 14 to be contained within the second resting panel 6. The accessory panel 11 is slidably engaged into the left storage compartment 3 while the writing panel 14 is slidably engaged into the right storage compartment 7, allowing the accessory panel 11 and the writing panel 14 to be slid into or drawn out of the left storage compartment 3 and the right storage compartment 7, respectively.

The foldable housing shell 1 further comprises a left lateral wall 4 and a left securing tab 5 as well as a corresponding right lateral wall 8 and a right securing tab 9. The left lateral wall 4 and the right lateral wall 8 allow a book or other reading material to be contained within the foldable housing shell 1 when the foldable housing shell 1 is folded or unfolded. The left lateral wall 4 is perpendicularly and perimetrically connected to the first resting panel 2 while the right lateral wall 8 is perpendicularly and perimetrically connected to the second resting panel 6. As such, the left lateral wall 4 and the right lateral wall 8 are able to form a containment structure within the first resting panel 2 and the second resting panel 6 by forming a perimeter that prevents book or other reading material from falling out of the foldable housing shell 1. The left securing tab 5 and the right securing tab 9 are utilized to respectively hold the front cover and the rear cover of a book or other reading material in place as well as pages. The left securing tab 5 and the right securing tab 9 are internally connected to the left lateral wall 4 and the right lateral wall 8, respectively. Because the left securing tab 5 and the right securing tab 9 are connected internally to the left lateral wall 4 and the right lateral wall 8, the left securing tab 5 and the right securing tab 9 are able to prevent a book or other reading material from falling out of the first resting panel 2 and the second resting panel 6. The left securing tab 5 is offset from the first resting panel 2 while the right securing tab 9 is similarly offset from the second resting panel 6. This allows the front cover to be secured in between the left securing tab 5 and the first resting panel 2 while the rear cover is secured in between the right securing tab 9 and the second resting panel 6. The left securing tab 5 is positioned opposite to the hollow spine 10 and the right securing tab 9 is positioned opposite to the hollow spine 10 as well. As such, the left securing tab 5 and the right securing tab 9 are positioned in a manner such that the left securing tab 5 and the right securing tab 9 are able to secure the outer edges of a corresponding front cover and a rear cover when the present invention is in use as a stand. The left securing tab 5 and the right securing tab 9 can also be used to secure and flip through the pages of a book so that the user can slide a page out from underneath the left securing tab 5 and can slide the page underneath the right securing tab 9 or vice versa. In the preferred embodiment of the present invention, the left securing tab 5 and the right securing tab 9 are spring-loaded.

Figure 8:
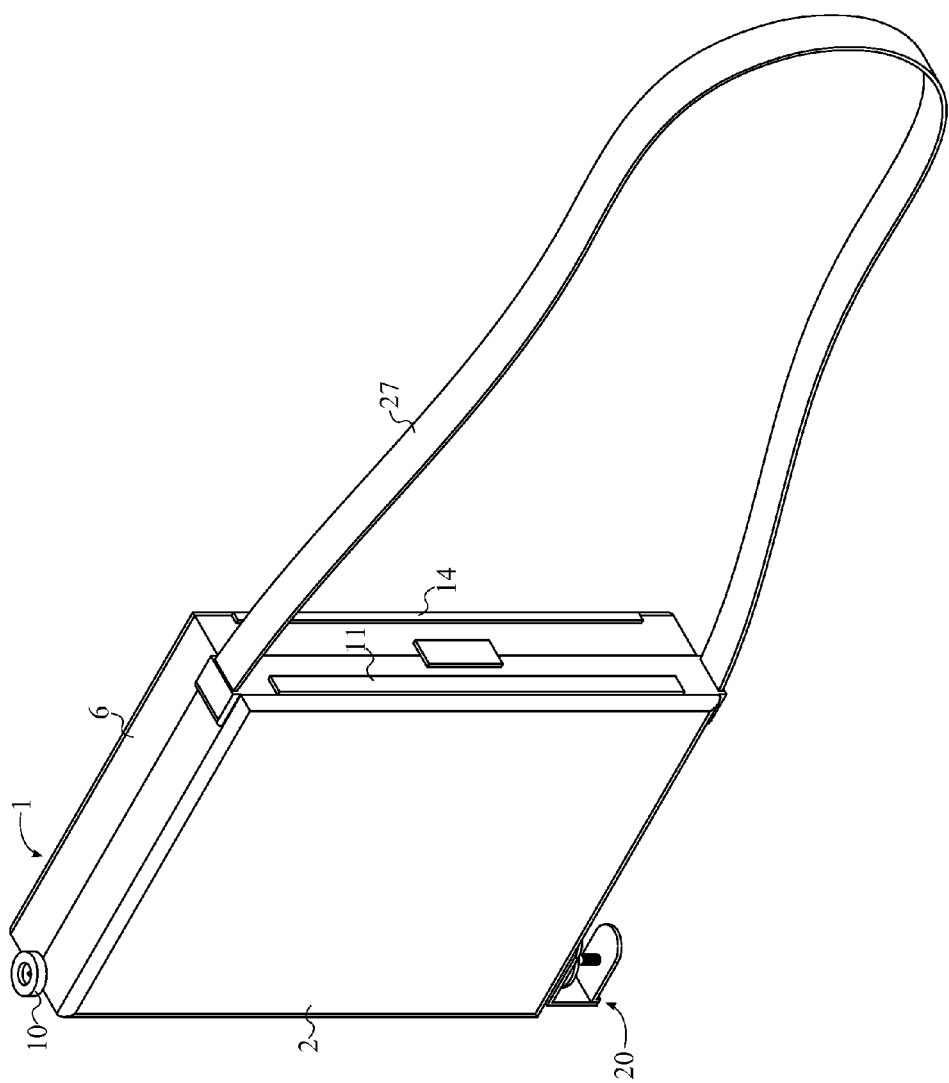
FIG. 8 is a front perspective view of the present invention in a closed configuration.
Figure 9:
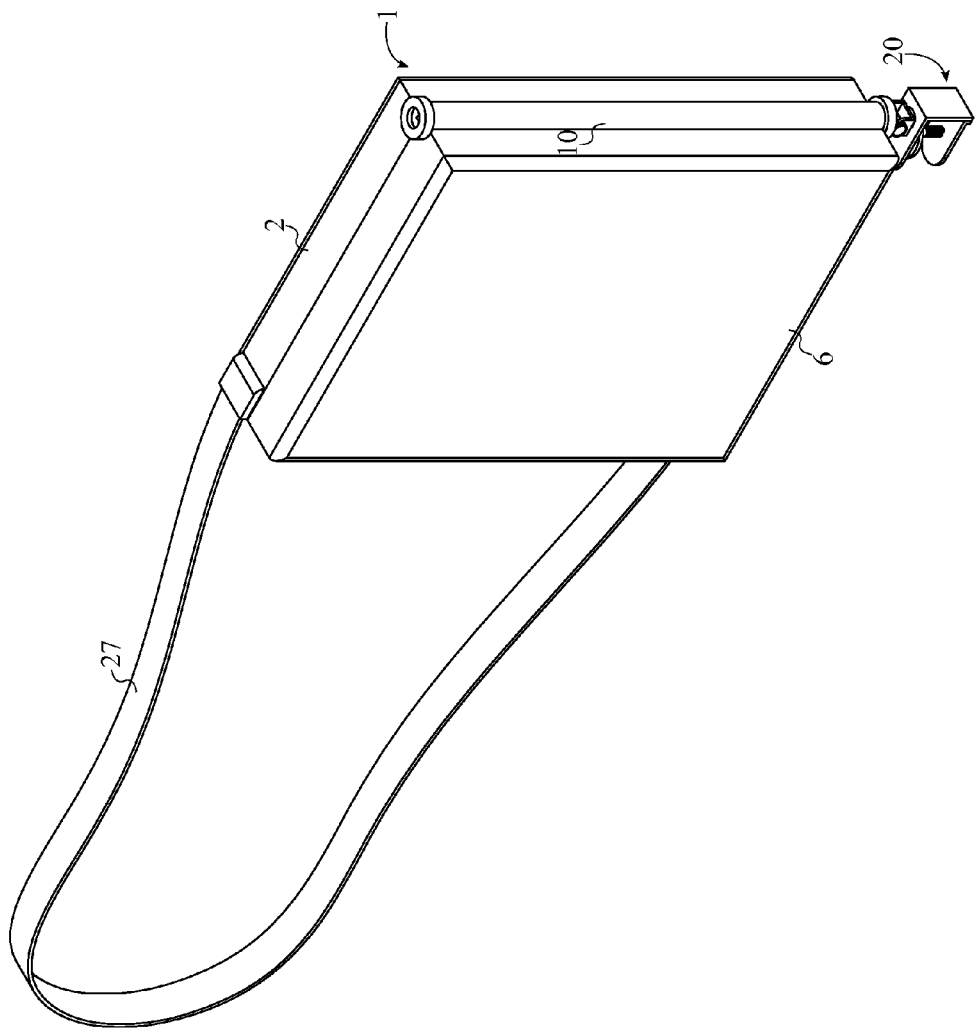
FIG. 9 is a back perspective view of the present invention in a closed configuration.

As shown in FIG. 8 and FIG. 9, the present invention further comprises a carrying strap 27. The carrying strap 27 is utilized to increase portability and facilitate handling of the present invention when the present invention is used to transport books and other reading materials. The carrying strap 27 is connected across the foldable housing shell 1, opposite to the hollow spine 10. Connecting the carrying strap 27 to the foldable housing shell 1 at two points provides increased stability when utilizing the carrying strap 27 to transport the present invention. Various embodiments of the present invention may include a carry handle as well in addition to the carrying strap 27.

With reference to FIG. 3, FIG. 5, and FIG. 7, the writing panel 14 comprises a writing surface 15, a writing lateral wall 16, and a spring-loaded clip 17. The writing surface 15 provides a flat and rigid surface on which the user is able to place paper or other stationery for support when writing. The writing lateral wall 16 functions in a similar manner as the left lateral wall 4 and the right lateral wall 8 and forms a containment structure within the writing panel 14 to prevent paper or other stationery from falling out of the writing panel 14. Much like the left lateral wall 4 and the right lateral wall 8, the writing lateral wall 16 is perpendicularly and perimetrically connected to the writing surface 15. As such, the writing lateral wall 16 forms a perimeter that prevents paper or other stationery from falling out of the writing panel 14. The spring-loaded clip 17 provides further security for the paper or other stationery on the writing surface 15 by temporarily pinning a portion of the paper or other stationery to the writing surface 15. The spring-loaded clip 17 is adjacently positioned within the writing lateral wall 16 in order to prevent the spring-loaded clip 17 from protruding beyond the writing lateral wall 16 and preventing the writing panel 14 from being slid into the right storage compartment 7 when the writing panel 14 is not in use. The spring-loaded clip 17 functions similar to a clipboard and is hingedly connected to the writing surface 15, allowing the user to hingedly actuate the spring-loaded clip 17 when pinning or freeing paper or other stationery on the writing surface 15.

With further reference to FIG. 4 and FIG. 6, the securing clamp 20 comprises an upper jaw 21, a lower jaw 22, an adjustable platform 23, an adjustment knob 24, a male threaded shaft 25, and a female threaded opening 26. In the preferred embodiment of the present invention, the upper jaw 21 is placed into contact with a surface of a desk or similar object to which the user wishes to mount the present invention. The lower jaw 22 is positioned across the desk or similar object and does not come into contact with the surface opposite to the surface that is placed into contact with the upper jaw 21. The adjustable platform 23 comes into contact with the surface opposite to the surface placed into contact with the upper jaw 21 and may be raised or lowered in order to tighten the securing clamp 20 to the desk or to loosen the securing clamp 20 for removal from the desk. The adjustment knob 24 is rotated clockwise or counterclockwise in order to correspondingly raise or lower the adjustable platform 23. The male threaded shaft 25 is able to rotate within the female threaded opening 26 during adjustment of the adjustable platform 23.

The upper jaw 21 and the lower jaw 22 are offset from and fixed to each other. This allows the upper jaw 21 to be placed into contact with a surface of the desk or similar object to which the user wishes to mount the present invention. The lower jaw 22 is offset from the upper jaw 21 and is positioned adjacent to the surface opposite to the surface in contact with the upper jaw 21. The pivot rod 19 is hingedly connected to the upper jaw 21, allowing the pitch orientation of the upper jaw 21 and the other components of the securing clamp 20 to be adjusted through the pivot rod 19. The adjustable platform 23 is positioned in between the upper jaw 21 and the lower jaw 22. As such, the adjustable platform 23 is able to come into contact with the surface opposite to the surface in contact with the upper jaw 21 when the securing clamp 20 is mounted to the desk or similar object. The adjustable platform 23 is adjacently connected to the male threaded shaft 25 while the adjustment knob 24 is connected adjacent to the male threaded shaft 25, opposite to the adjustable platform 23. This allows the positioning of the adjustable platform 23 to be adjusted by rotating the adjustment knob 24 and the male threaded shaft 25. The female threaded opening 26 traverses through the lower jaw 22 while the male threaded shaft 25 is engaged to the female threaded opening 26. As such, the male threaded shaft 25 is able to rotate within the female threaded opening 26 in order to adjust the position of the adjustable platform 23 in between the upper jaw 21 and the lower jaw 22.

Again with reference to FIG. 3, FIG. 5, and FIG. 7, the present invention further comprises a plurality of accessory holders 28. The plurality of accessory holders 28 is utilized to safely secure and stow various accessories such as, but not limited to, writing utensils. The accessory panel 11 comprises an accessory surface 12 and an accessory lateral wall 13. The accessory surface 12 provides a surface onto which the plurality of accessory holders 28 is mounted. In the preferred embodiment of the present invention, the plurality of accessory holders 28 is distributed across the accessory panel 11, allowing the plurality of accessory holders 28 and accessories within to be safely contained on the accessory panel 11. Similar to the left lateral wall 4, the right lateral wall 8, and the writing lateral wall 16, the accessory lateral wall 13 is perpendicularly and perimetrically connected to the accessory surface 12 in order to allow the accessory lateral wall 13 to form a perimeter that prevents any accessories from falling out of the accessory panel 11.

While the present invention is primarily intended for use in transporting and supporting reading materials such as books, magazines, and textbooks, the present invention may additionally be utilized in conjunction with electronic devices such as, but not limited to, tablet computers. The tablet computer may be placed into the first resting panel 2 or the second resting panel 6 and held in place by the left lateral wall 4 or the right lateral wall 8.

Although the present invention has been explained in relation to its preferred embodiment, it is understood that many other possible modifications and variations can be made without departing from the spirit and scope of the present invention as hereinafter claimed.

What is claimed is:

1. A reading material carrier and stand comprises:
   a foldable housing shell;
   an accessory panel;
   a writing panel;
   a snake lamp;
   a pivot rod;
   a securing clamp;
   the foldable housing shell comprises a first resting panel, a second resting panel, and a hollow spine;
   the first resting panel being hingedly connected to the second resting panel by the hollow spine;
   the accessory panel being slidably mounted into the first resting panel, opposite to the hollow spine;
   the writing panel being slidably mounted into the second resting panel, opposite to the hollow spine;
   the snake lamp being telescopically mounted into the hollow spine;
   the pivot rod being telescopically mounted into the hollow spine, opposite to the snake lamp; and
   the securing clamp being hingedly connected to the pivot rod, opposite to the hollow spine.

2. The reading material carrier and stand as claimed in claim 1 further comprises:
   the first resting panel comprises a left storage compartment;
   the left storage compartment traversing into the first resting panel, opposite to the hollow spine; and
   the accessory panel being slidably engaged into the left storage compartment.

3. The reading material carrier and stand as claimed in claim 1 further comprises:
   the second resting panel comprises a right storage compartment;
   the right storage compartment traversing into the second resting panel, opposite to the hollow spine; and
   the writing panel being slidably engaged into the right storage compartment.

4. The reading material carrier and stand as claimed in claim 1 further comprises:
   the foldable housing shell further comprises a left lateral wall and a left securing tab;
   the left lateral wall being perpendicularly and perimetrically connected to the first resting panel;
   the left securing tab being internally connected to the left lateral wall;
   the left securing tab being offset from the first resting panel; and
   the left securing tab being positioned opposite to the hollow spine.

5. The reading material carrier and stand as claimed in claim 1 further comprises:

the foldable housing shell further comprises a right lateral wall and a right securing tab;
the right lateral wall being perpendicularly and perimetrically connected to the second resting panel;
the right securing tab being internally connected to the right lateral wall;
the right securing tab being offset from the second resting panel; and
the right securing tab being positioned opposite to the hollow spine.

6. The reading material carrier and stand as claimed in claim 1 further comprises:
a carrying strap; and
the carrying strap being connected across the foldable housing shell, opposite to the hollow spine.

7. The reading material carrier and stand as claimed in claim 1 further comprises:
the writing panel comprises a writing surface, a writing lateral wall, and a spring-loaded clip;
the writing lateral wall being perpendicularly and perimetrically connected to the writing surface;
the spring-loaded clip being adjacently positioned within the writing lateral wall; and
the spring-loaded clip being hingedly connected to the writing surface.

8. The reading material carrier and stand as claimed in claim 1 further comprises:
the securing clamp comprises an upper jaw, a lower jaw, an adjustable platform, an adjustment knob, a male threaded shaft, and a female threaded opening;
the upper jaw and the lower jaw being offset from and fixed to each other;
the pivot rod being hingedly connected to the upper jaw;
the adjustable platform being positioned in between the upper jaw and the lower jaw;
the adjustable platform being adjacently connected to the male threaded shaft;
the adjustment knob being connected adjacent to the male threaded shaft, opposite to the adjustable platform;
the female threaded opening traversing through the lower jaw; and
the male threaded shaft being engaged to the female threaded opening.

9. The reading material carrier and stand as claimed in claim 1 further comprises:
a plurality of accessory holders;
the accessory panel comprises an accessory surface and an accessory lateral wall;
the accessory lateral wall being perpendicularly and perimetrically connected to the accessory surface; and
the plurality of accessory holders being distributed across the accessory panel.

10. A reading material carrier and stand comprises:
a foldable housing shell;
an accessory panel;
a writing panel;
a snake lamp;
a pivot rod;
a securing clamp;
the foldable housing shell comprises a first resting panel, a second resting panel, and a hollow spine;
the first resting panel comprises a left storage compartment;
the second resting panel comprises a right storage compartment;
the first resting panel being hingedly connected to the second resting panel by the hollow spine;
the accessory panel being slidably mounted into the first resting panel, opposite to the hollow spine;
the writing panel being slidably mounted into the second resting panel, opposite to the hollow spine;
the snake lamp being telescopically mounted into the hollow spine;
the pivot rod being telescopically mounted into the hollow spine, opposite to the snake lamp;
the securing clamp being hingedly connected to the pivot rod, opposite to the hollow spine;
the left storage compartment traversing into the first resting panel, opposite to the hollow spine;
the accessory panel being slidably engaged into the left storage compartment;
the right storage compartment traversing into the second resting panel, opposite to the hollow spine; and
the writing panel being slidably engaged into the right storage compartment.

11. The reading material carrier and stand as claimed in claim 10 further comprises:
the foldable housing shell further comprises a left lateral wall and a left securing tab;
the left lateral wall being perpendicularly and perimetrically connected to the first resting panel;
the left securing tab being internally connected to the left lateral wall;
the left securing tab being offset from the first resting panel; and
the left securing tab being positioned opposite to the hollow spine.

12. The reading material carrier and stand as claimed in claim 10 further comprises:
the foldable housing shell further comprises a right lateral wall and a right securing tab;
the right lateral wall being perpendicularly and perimetrically connected to the second resting panel;
the right securing tab being internally connected to the right lateral wall;
the right securing tab being offset from the second resting panel; and
the right securing tab being positioned opposite to the hollow spine.

13. The reading material carrier and stand as claimed in claim 10 further comprises:
a carrying strap; and
the carrying strap being connected across the foldable housing shell, opposite to the hollow spine.

14. The reading material carrier and stand as claimed in claim 10 further comprises:
the writing panel comprises a writing surface, a writing lateral wall, and a spring-loaded clip;
the writing lateral wall being perpendicularly and perimetrically connected to the writing surface;
the spring-loaded clip being adjacently positioned within the writing lateral wall; and
the spring-loaded clip being hingedly connected to the writing surface.

15. The reading material carrier and stand as claimed in claim 10 further comprises:
the securing clamp comprises an upper jaw, a lower jaw, an adjustable platform, an adjustment knob, a male threaded shaft, and a female threaded opening;
the upper jaw and the lower jaw being offset from and fixed to each other;
the pivot rod being hingedly connected to the upper jaw;
the adjustable platform being positioned in between the upper jaw and the lower jaw;

the adjustable platform being adjacently connected to the male threaded shaft;

the adjustment knob being connected adjacent to the male threaded shaft, opposite to the adjustable platform;

the female threaded opening traversing through the lower jaw; and the male threaded shaft being engaged to the female threaded opening.

16. The reading material carrier and stand as claimed in claim 10 further comprises:

a plurality of accessory holders;

the accessory panel comprises an accessory surface and an accessory lateral wall;

the accessory lateral wall being perpendicularly and perimetrically connected to the accessory surface; and the plurality of accessory holders being distributed across the accessory panel.

17. A reading material carrier and stand comprises:

a foldable housing shell;

an accessory panel;

a writing panel;

a snake lamp;

a pivot rod;

a securing clamp;

the foldable housing shell comprises a first resting panel, a second resting panel, a hollow spine, a left lateral wall, a left securing tab, a right lateral wall, and a right securing tab;

the writing panel comprises a writing surface, a writing lateral wall, and a spring-loaded clip;

the first resting panel comprises a left storage compartment;

the second resting panel comprises a right storage compartment;

the first resting panel being hingedly connected to the second resting panel by the hollow spine;

the accessory panel being slidably mounted into the first resting panel, opposite to the hollow spine;

the writing panel being slidably mounted into the second resting panel, opposite to the hollow spine;

the snake lamp being telescopically mounted into the hollow spine;

the pivot rod being telescopically mounted into the hollow spine, opposite to the snake lamp;

the securing clamp being hingedly connected to the pivot rod, opposite to the hollow spine;

the left storage compartment traversing into the first resting panel, opposite to the hollow spine;

the accessory panel being slidably engaged into the left storage compartment;

the right storage compartment traversing into the second resting panel, opposite to the hollow spine;

the writing panel being slidably engaged into the right storage compartment;

the left lateral wall being perpendicularly and perimetrically connected to the first resting panel;

the left securing tab being internally connected to the left lateral wall;

the left securing tab being offset from the first resting panel;

the left securing tab being positioned opposite to the hollow spine;

the right lateral wall being perpendicularly and perimetrically connected to the second resting panel;

the right securing tab being internally connected to the right lateral wall;

the right securing tab being offset from the second resting panel;

the right securing tab being positioned opposite to the hollow spine;

the writing lateral wall being perpendicularly and perimetrically connected to the writing surface;

the spring-loaded clip being adjacently positioned within the writing lateral wall; and the spring-loaded clip being hingedly connected to the writing surface.

18. The reading material carrier and stand as claimed in claim 17 further comprises:

a carrying strap; and the carrying strap being connected across the foldable housing shell, opposite to the hollow spine.

19. The reading material carrier and stand as claimed in claim 17 further comprises:

the securing clamp comprises an upper jaw, a lower jaw, an adjustable platform, an adjustment knob, a male threaded shaft, and a female threaded opening;

the upper jaw and the lower jaw being offset from and fixed to each other;

the pivot rod being hingedly connected to the upper jaw;

the adjustable platform being positioned in between the upper jaw and the lower jaw;

the adjustable platform being adjacently connected to the male threaded shaft;

the adjustment knob being connected adjacent to the male threaded shaft, opposite to the adjustable platform;

the female threaded opening traversing through the lower jaw; and the male threaded shaft being engaged to the female threaded opening.

20. The reading material carrier and stand as claimed in claim 17 further comprises:

a plurality of accessory holders;

the accessory panel comprises an accessory surface and an accessory lateral wall;

the accessory lateral wall being perpendicularly and perimetrically connected to the accessory surface; and the plurality of accessory holders being distributed across the accessory panel.

\* \* \* \* \*